United States Patent [19]

Gyugyi

[11] Patent Number: 4,555,659
[45] Date of Patent: Nov. 26, 1985

[54] STATIC VAR GENERATOR SYSTEM HAVING IMPROVED RESPONSE TIME

[75] Inventor: Laszlo Gyugyi, Penn Hills, Pa.

[73] Assignee: Westinghouse Electric Corp., Pittsburgh, Pa.

[21] Appl. No.: 584,203

[22] Filed: Feb. 27, 1984

[51] Int. Cl.[4] .............................................. G05F 1/70
[52] U.S. Cl. ................................................... 323/210
[58] Field of Search ............... 323/207, 208, 209, 210, 323/211

[56] References Cited

U.S. PATENT DOCUMENTS

| | | | |
|---|---|---|---|
| 3,999,117 | 12/1976 | Gyugyi | 323/210 |
| 4,068,159 | 1/1978 | Gyugyi | 323/210 |
| 4,135,128 | 1/1979 | Kelly, Jr. | 323/210 |

Primary Examiner—Peter S. Wong
Assistant Examiner—Judson H. Jones
Attorney, Agent, or Firm—John Victor Pezdek; Benjamin Hudson, Jr.

[57] ABSTRACT

A static VAR generator utilizing a multitude of reactor banks each having different computation circuits and firing angle control circuits is provided. The different computation and firing angle control circuits allows the VAR generator the flexibility of being able to change the reactor power in an A.C. network repetitively in any cycle in response to rapid changes in load demand. This is accomplished by each reactor bank having progressively longer computation times and later insertion of additional banks into the network after the first bank has responded to load demand.

2 Claims, 4 Drawing Figures

STATIC VAR GENERATOR SYSTEM HAVING IMPROVED RESPONSE TIME

BACKGROUND OF THE INVENTION

1. Field of the Invention

This invention relates generally to static VAR generators that supply reactive power to rapidly fluctuating loads and, more particularly, to VAR generators that supply reactive power having control techniques that minimize the response time for effective compensation for rapidly varying electrical loads.

2. Description of the Prior Art

A static VAR generator is generally comprised of three Δ-connected inductors controlled by anti-parallel thyristors that are excited every half cycle to provide a balanced reactive current component to an A.C. network to compensate for heavy reactive loads in the system. As shown in FIGS. 1A and 1B, typical for all three phases, the thyristors are fired at control angles $\alpha$ at points which relate to peak line-to-line voltages which correspond to the zero current crossover points to minimize instability in the electrical network.

U.S. Pat. No. 3,999,117 issued Dec. 21, 1976 to L. Gyugyi et al. teaches a control scheme for firing anti-parallel thyristors to insert reactors into an A.C. network for compensation thereof. This patent discloses how the three firing angles, $\alpha_{12}$, $\alpha_{23}$ and $\alpha_{31}$, representative of the three phases of a three-phase system, are electronically computed. First, the required currents in the thyristor-controlled reactors are calculated by a desired inductor current computing circuit from the currents or power drawn by the individual phases of the load during half or full cycle intervals just preceding the earliest firing point $\alpha_c$. Second, the firing angles are computed by a current-to-firing angle converter using an appropriate mathematical relationship between the firing angle and the fundamental component of current in the thyristor-controlled reactor. These computations, which take place in each half or full cycle, are synchronized to the A.C. supply voltages by a timing pulse generator. The firing angle for each reactor can be set once in each half cycle. This means that the output current in each phase of the VAR generator can be adjusted only once in each half cycle. The maximum range of the firing angle control, measured from the peak of the applied voltage, is 90 electrical degrees with $\alpha_c$ equal to zero; if $\alpha_c$ does not equal zero, then the range is 90° minus $\alpha_c$. The 90° interval, in which the thyristor switch can be rendered conductive, may be termed firing interval. The interval between the starting points of any two successive firing intervals may be termed computation interval, during which the desired inductor current is computed as shown in FIG. 1B.

In U.S. Pat. No. 4,068,159 issued to L. Gyugyi, et al. a static VAR generator is described that introduces a fixed delay angle $\alpha_c$ and reduces the inductance of the thyristor-controlled reactor so that $\alpha_c$, the maximum required reactor current, is obtained. This method is beneficial in reducing the size of the reactor, and it may also improve the response time.

The most fundamental cause of time delay in state-of-the art static VAR generators is due to the fact that the current in the reactor can be changed only once in each half cycle. After the computations are complete, the output current for the VAR generator can be adjusted only once. Consequently, after the first sampling and computation time elapses, if the reacted demand should change suddenly, the VAR generator cannot further adjust its output until the next half cycle. It would be desirable for a VAR generator design to have the capability to allow further corrective action to be taken in response to any reactive demand change that may occur after the first sampling and computation time interval for each half cycle.

SUMMARY OF THE INVENTION

There is provided by this invention a static VAR generator having a multitude of thyristor-controlled reactor banks controlled by a redundant phase angle firing control system. Each inductor bank has an individual control channel CH1, CH2, CH3 interconnected so that the multiple inductor banks may be inserted into an A.C. network sequentially having progressively longer computing intervals and progressively later firing intervals. The multitude of reactor banks allow the static VAR generator to correct for rapid changes in the network's reactive power demand after corrective action has been taken by the initial insertion of a reactor bank in a given cycle by providing additional reactors on standby. Each reactor has a separate phase angle firing control distinguished from each other by having progressively longer computing intervals and later phase angle firing intervals that allow insertion of additional reactors throughout any given cycle in which corrective action must be taken.

DESCRIPTION OF THE PREFERRED EMBODIMENT

Figure 1B:
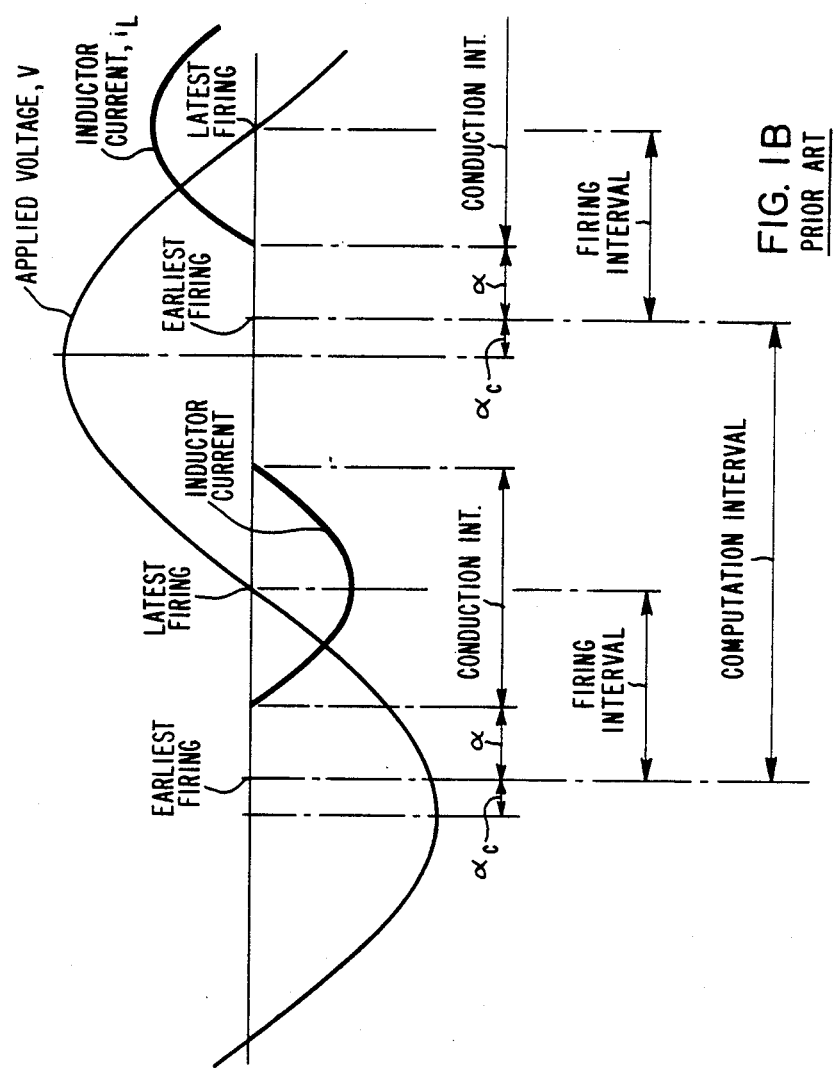
FIGS. 1A and 1B show a prior art VAR generator illustrating waveforms for the control scheme.
Figure 1A:
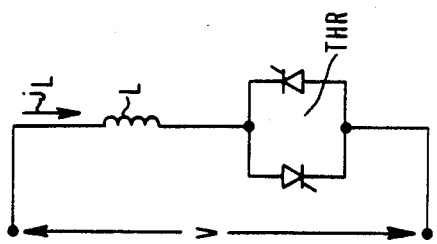
Figure 2:
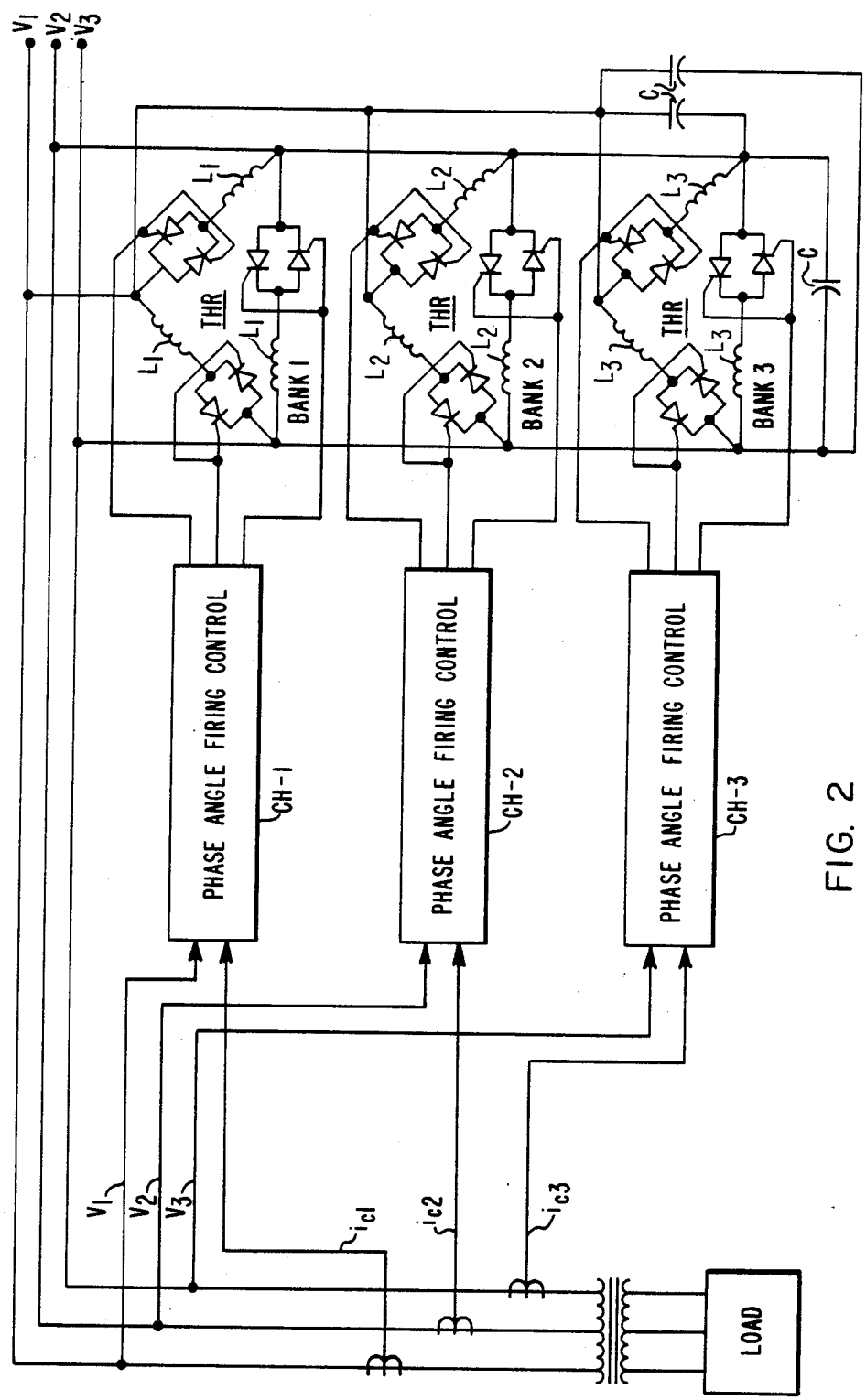
FIG. 2 is a static VAR generator having three channels of control incorporating the principles of this invention.

Referring to FIG. 2, there is shown a static VAR generator employing a number of three-phase thyristor-controlled reactor banks. Each reactor bank is controlled by a separate control channel having a different phase angle firing interval. The control method employed in each control channel for a three-phase reactor bank utilizes reduced firing intervals as described in U.S. Pat. No. 4,068,159. Inasmuch as a detailed description of the control system is disclosed in the aforementioned patent, to which reference is made for a complete description of structure and operation, the description of those portions is limited to the parts that are essential to the operation of the invention disclosed herein.

Figure 3:
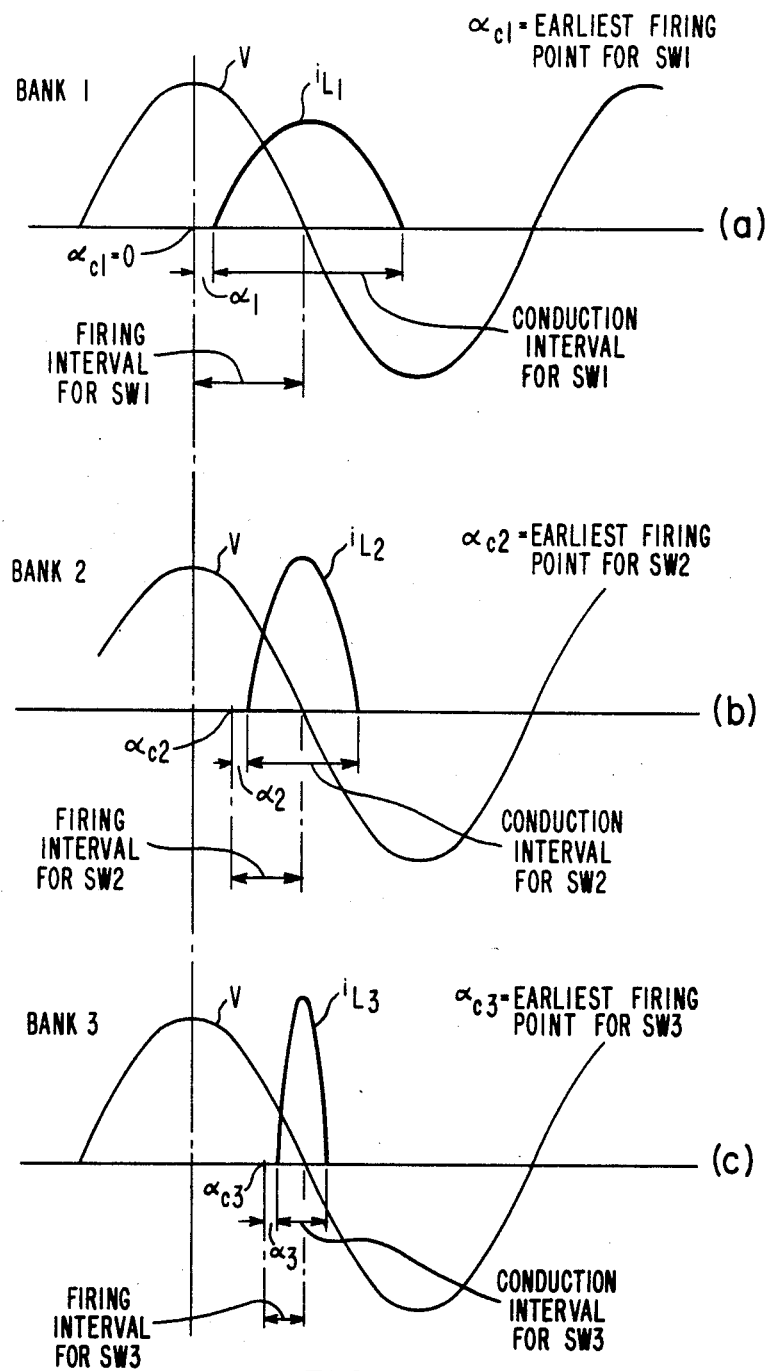
FIG. 3 illustrates voltage and inductive current waveforms for the reactor banks shown in FIG. 1.

The proposed VAR generator system generally incorporates a number, n, wherein n is greater than one three-phase thyristor-controlled reactor bank which is connected to the same A.C. supply, but controlled over an increasingly reduced firing interval as illustrated for three reactor banks in FIG. 3. As illustrated, by setting the earliest firing point to coincide with the peak of the applied A.C. voltage, the first thyristor-controlled reactor bank, BANK 1, is controlled over the total firing interval of approximately 90 electrical degrees which correspond to a maximum of 180° conduction interval. The second thyristor-controlled reactor bank, BANK 2, is controlled over a shorter firing interval which is approximately two-thirds of the firing interval of BANK 1. This means that the earliest firing point for the second bank is shifted from zero to $\alpha_{c2}$. As a consequence of the decreased firing interval, the maximum conduction interval is also reduced to two-thirds of that a BANK 1. In order to keep the maximum fundamental current attainable in the second bank with the reduced conduction interval similar to that of the first bank, the inductance, $L_2$, of the second bank is appropriately reduced from the inductance, $L_1$, of the first bank. The third thyristor-controlled bank, BANK 3, is controlled over an even shorter firing interval than BANK 2. The firing interval of BANK 3 is only one-third of that of BANK 1. The earliest firing for the third bank is shifted from zero to $\alpha_{c3}$. As a result, the maximum conduction interval of the third bank is also further reduced to one-third of that of BANK 1. In order to make attainable maximum fundamental current in BANK 3 comparable to that of the other two banks, the inductance, $L_3$, of BANK 3 is appropriately reduced from the inductances of $L_1$ and $L_2$ in such a way that $L_1 > L_2 > L_3$. The inductances, $L_2$ and $L_3$, can be calculated from the inductance $L_1$ for the selected earliest firing points, $\alpha_{c1}$ and $\alpha_{c2}$, to provide identical maximum fundamental currents from the following relationships:

$$L_2 = L_1(2/\pi)((\pi/2) - \alpha_{c2} - \tfrac{1}{2}\sin 2\alpha_{c2})$$

$$L_3 = L_1(2/\pi)((\pi/2) - \alpha_{c3} - \tfrac{1}{2}\sin 2\alpha_{c3})$$

The purpose of using three thyristor-controlled reactor banks, which are controlled over successively reduced firing and conduction intervals, in the proposed VAR generator system is to overcome the basic limitation of the state-of-the-art VAR generators for fast response, which is due to the fact that the reactive current can be changed only once in each half cycle. Clearly, with the proposed system, the total reactive output current of the VAR generator can be changed successively three times in each half cycle. At each change the reactive output current, which is the sum of the currents and the reactors averaged over a half cycle, can be increased or decreased. The overall delay time in controlling the output current in the proposed system is about one-half of that attainable in the prior art VAR generators. The reduced delay time results in improved response of control that makes the VAR generator more effective than its state-of-the-art counterpart in compensating rapidly changing loads such as electric arc furnaces.

Although there has been illustrated and described specific structure, it is to be clearly understood that the same were merely for purposes of illustration and that changes and modifications may be readily made therein by those skilled in the art without departing from the spirit and scope of this invention.

I claim:

1. A static VAR generator, comprising:
    (a) a plurality of reactance means connected to anti-parallel thyristors for connection into an AC network;
    (b) a VAR monitoring means connected to the A.C. network for monitoring its reactive requirements;
    (c) a plurality of control means connected to the VAR monitoring means and each of said plurality of control means is connected to at least one of said plurality of reactance means for individually connecting a reactance means into the A.C. network in response to its reactive requirements; and
    (d) each of said plurality of control means is comprised of a phase angle firing control for the anti-parallel thyristors having different firing intervals wherein the different firing intervals provide for progressively later connection of each of said plurality of reactance means into the A.C. network.

2. A static VAR generator as recited in claim 1 wherein each of said plurality of reactance means is proportionally reduced in value to provide equal maximum current outputs irrespective of their different firing intervals.

* * * * *